United States Patent [19]
Maeno et al.

[11] Patent Number: 5,585,685
[45] Date of Patent: Dec. 17, 1996

[54] VIBRATION DRIVEN APPARATUS

[75] Inventors: Takashi Maeno, Kawasaki; Ichiro Okumura, Yokohama; Takayuki Tsukimoto, Fujisawa, all of Japan

[73] Assignee: Canon Kabushiki Kaisha, Tokyo, Japan

[21] Appl. No.: 309,656

[22] Filed: Sep. 21, 1994

[30] Foreign Application Priority Data

Sep. 22, 1993 [JP] Japan .................................. 5-236522

[51] Int. Cl.⁶ ...................................................... H02N 2/00
[52] U.S. Cl. ............................................ 310/323; 310/328
[58] Field of Search ...................................... 310/323, 328

[56] References Cited

U.S. PATENT DOCUMENTS

| | | | |
|---|---|---|---|
| 4,580,073 | 4/1986 | Okumura et al. | 310/323 |
| 4,587,452 | 5/1986 | Okumura et al. | 310/328 |
| 4,678,956 | 7/1987 | Izukawa et al. | 310/323 |
| 4,692,650 | 9/1987 | Okumura et al. | 310/323 |
| 4,692,651 | 9/1987 | Hiramatsu et al. | 310/323 |
| 4,736,131 | 4/1988 | Fujimoto | 310/328 |
| 4,752,787 | 6/1988 | Matsumoto et al. | 346/140 R |
| 4,763,148 | 8/1988 | Tsukimoto et al. | 354/195.1 |
| 4,788,468 | 11/1988 | Izukawa et al. | 310/323 |
| 4,944,222 | 7/1990 | Tyrén | 310/328 |
| 4,958,100 | 9/1990 | Crawley et al. | 310/328 |
| 5,039,899 | 8/1991 | Yamaguchi | 310/323 |
| 5,099,166 | 3/1992 | Hirano et al. | 310/323 |
| 5,264,755 | 11/1993 | Hettlage et al. | 310/328 |
| 5,274,295 | 12/1993 | Tsukimoto et al. | 310/323 |
| 5,298,829 | 3/1994 | Tsukimoto et al. | 310/323 |
| 5,300,850 | 4/1994 | Okumura et al. | 310/323 |
| 5,359,251 | 10/1994 | Tsukimoto et al. | 310/323 |
| 5,387,835 | 2/1995 | Tsukimoto et al. | 310/323 |
| 5,436,522 | 7/1995 | Tsukimoto et al. | 310/323 |

FOREIGN PATENT DOCUMENTS

| | | | |
|---|---|---|---|
| 0059980 | 4/1985 | Japan | 310/328 |
| 60-170471 | 9/1985 | Japan | H02N 2/00 |
| 0017874 | 1/1990 | Japan | 310/323 |
| 491668 | 3/1992 | Japan | H02N 2/00 |
| 5184172 | 7/1993 | Japan | 310/328 |

Primary Examiner—Thomas M. Dougherty
Attorney, Agent, or Firm—Fitzpatrick, Cella, Harper & Scinto

[57] ABSTRACT

A vibration driven device includes a first vibration elastic member, a second vibration elastic member, an electromechanical energy conversion element clamped between the first and second vibration elastic members, and a first contact member contacting at least one of the first and second vibration elastic members. A projection region which does not overlap the conversion element is arranged on the one vibration elastic member, the first contact member contacts only the projection region, and the first contact member moves relative to the one vibration elastic member by a vibration of the one vibration elastic member.

52 Claims, 6 Drawing Sheets

A PHASE
(THE UPPER TWO)

B PHASE
(THE THIRD AND THE FOURTH
FROM THE TOP)

# 5,585,685

VIBRATION DRIVEN APPARATUS

BACKGROUND OF THE INVENTION

1. Field of the Invention

The present invention relates to a vibration driven apparatus which clamps an electro-mechanical energy conversion element between first and second elastic vibration members.

2. Related Background Art

As a conventional vibration wave driven apparatus, e.g., an ultrasonic motor, the following two types are known. In one type, a piezoelectric element as an electro-mechanical energy conversion element is joined to one surface of a planar or ring-shaped elastic vibration member using an adhesive, and a driving voltage is applied to the piezoelectric element to generate expansion/contraction in a direction perpendicular to the thickness direction of the piezoelectric element in the elastic vibration member. The expansion/contraction mode is formed to have, e.g., a phase shift of λ(wavelength)/4 to form two phases, i.e., A and B phases, and a travelling wave is formed on the elastic vibration member by synthesizing the two standing waves (U.S. Pat. No. 4,587,452, U.S. Pat. No. 4,587,452, and the like). In the other type, disk-shaped piezoelectric elements are arranged between rod-shaped vibration elastic members in correspondence with, e.g., two phases (A and B phases), and a driving voltage is applied to the piezoelectric elements to generate bending vibrations in the rod-shaped elastic vibration members by expansion/contraction of the piezoelectric elements in their thickness direction. Upon synthesis of the two bending vibrations positionally having a 90° phase shift therebetween, a travelling wave is formed in the driving surfaces of the vibration elastic members (U.S. Ser. No. 008,068, Japanese Laid-Open Patent Application No. 4-91668, and the like). In both types of vibration wave driven apparatuses, an elliptic motion is formed in surface particles of the driving surface on which the travelling wave is formed.

More specifically, the type employing the planar or ring-shaped elastic vibration member utilizes a distortion formed on the elastic vibration member by the expansion/contraction in a direction perpendicular to the thickness direction (to be referred to as an in-plane direction hereinafter) of the piezoelectric element, and forms a vibration (having two or more node diameters) of a wave number of 2 or more on the elastic vibration member.

On the other hand, in the type employing the rod-shaped elastic vibration members, a travelling wave is formed by utilizing bending vibrations produced in a direction perpendicular to the longitudinal direction of a vibration perpendicular upon displacement, in the thickness direction (to be referred to as an out-of-plane direction hereinafter), of the piezoelectric elements.

However, the type having the planar or ring-shaped elastic vibration member suffers the following problems.

(1): When the element has a ring shape, a decrease in diameter of the vibration member is limited, and it is difficult to miniaturize the apparatus.

(2): Since vibration in the in-plane direction of the piezoelectric element is used, the frictional driving force factor is small.

(3): Since the piezoelectric element is joined using an adhesive, manufacturing cost increases.

On the other hand, since the type having the rod-shaped vibration elastic members utilizes a bending vibration in the axial direction of a rod-shaped vibration member having an axial length greatly larger than its diameter, the length of the vibration member becomes large.

Applicants' Japanese Laid-Open Patent Application No. 60-170471 relates to the conventional art, wherein two electrostrictive elements are clamped between first and second vibration elastic members.

SUMMARY OF THE INVENTION

One aspect of the invention is to provide a vibration driven apparatus in which an electro-mechanical energy conversion element is clamped between first and second elastic vibration members, at least one elastic vibration member is formed to project from a region of the conversion element, and a movement relative to a contact member is achieved by a vibration formed on the projecting portion, and which generates a large driving force and can be miniaturized.

BRIEF DESCRIPTION OF THE DRAWINGS

FIGS. 2A and 2B show vibration modes of a vibration member shown in FIG. 1, in which FIG. 2A shows a vibration mode obtained when the number of node diameters is 1, and FIG. 2B shows a vibration mode obtained when the number of node diameters is 2;

FIGS. 4A and 4B are exploded perspective views showing the stack states and polarization directions of piezoelectric elements shown in FIG. 1, in which FIG. 4A shows the state when the number of node diameters is 1, and FIG. 4B shows the state when the number of node diameters is 2;

FIGS. 6A and 6B show vibration modes of the embodiment shown in FIG. 5, in which FIG. 6A shows a vibration mode obtained when the number of node diameters is 1, and FIG. 6B shows a vibration mode obtained when the number of node diameters is 2;

FIGS. 11A and 11B show vibration modes of an elastic vibration member having, e.g., a disk shape in the present invention, in which FIG. 11A shows a vibration mode obtained when the number of node diameters is 1, and FIG. 11B shows a vibration mode obtained when the number of node diameters is 2.

DETAILED DESCRIPTION OF THE PREFERRED EMBODIMENTS

Figure 1:
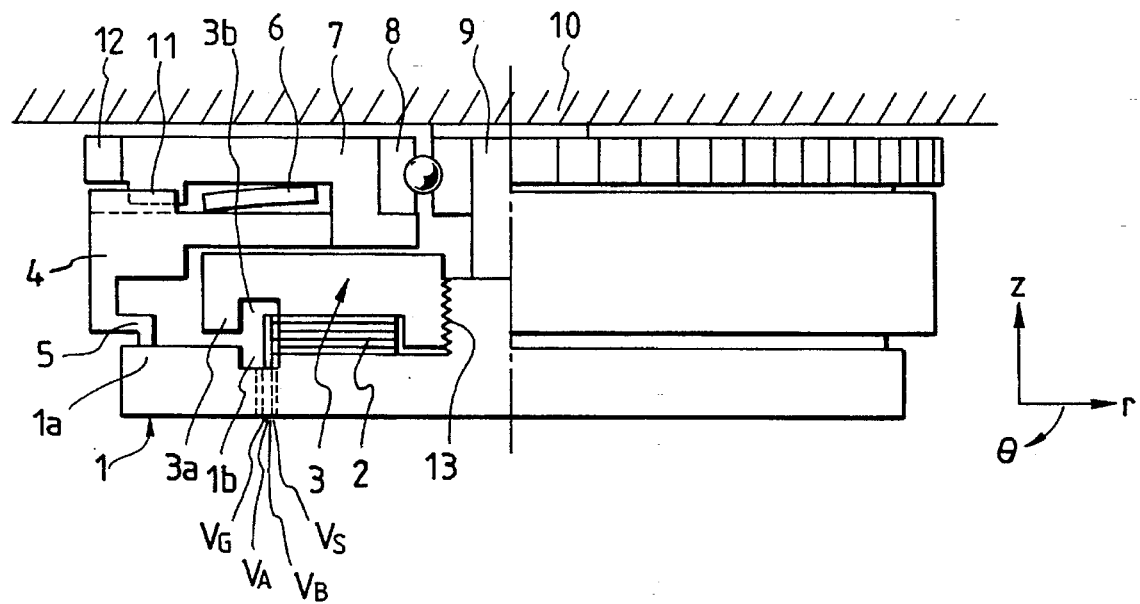
FIG. 1 is a side sectional view showing the first embodiment of the present invention.

FIG. 1 is a side sectional view showing the first embodiment of the present invention.

A main elastic vibration member 1 has a driving surface and is formed into a disk shape. The main vibration elastic member 1 is concentrically and threadably coupled to a sub elastic vibration member 3 by screw portions 13 formed at their respective portions. A plurality of piezoelectric elements 2 including disk-shaped driving and vibration detection piezoelectric elements, are clamped and fixed between the main and sub elastic vibration members 1 and 3 to sandwich electrode plates (not shown) therebetween. The elastic members 1 and 3, the piezoelectric elements 2, and the electrode plates constitute a vibration member. A support rod 9 which extends coaxially with the screw portions 13 is fixed to a fixing member 10 to fix the vibration member.

The main elastic vibration member 1 has a driving portion 1a as an outer peripheral portion, and is formed with a circumferential groove 1b for amplifying a vibration displacement of the driving portion at the inner peripheral side of the driving portion 1a. The sub elastic vibration member 3 is formed to have a diameter smaller than that of the main elastic vibration member 1, and is formed with a flange portion 3a as a vibration balancer on its outer peripheral portion. Note that the sub vibration elastic vibration member 3 is formed with a circumferential groove 3b for amplifying a vibration displacement of the flange portion 3a, but this groove is not always necessary.

A rotor 4 as a contact member has a collar spring-shaped sliding portion (contact portion) 5 which contacts the driving portion 1a of the main elastic vibration member 1. The rotor 4 is engaged with a pawl portion 11 of an output member 7 which is arranged coaxially with the rotor 4, and is coupled to the output member 7 to be movable in the axial direction and to be immovable in the circumferential direction. The sliding portion 5 of the rotor 4 is in press contact with the driving portion 1a by a Belleville spring 6 elastically inserted between the rotor 4 and the output member 7. The output member 7 is fixed to the outer race of a ball bearing 8 fitted on the support rod 9, and can extract the rotation of the rotor 4 to an external portion by a gear portion 12 formed on its outer circumferential portion.

Figure 4A:
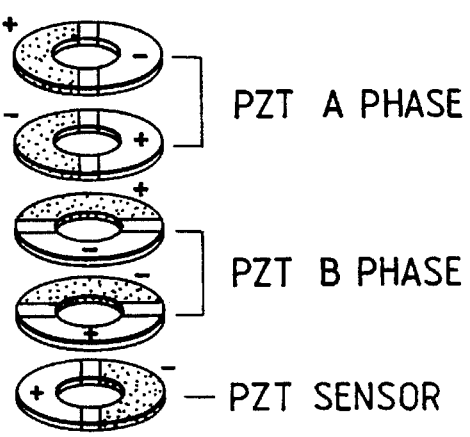
Figure 4B:
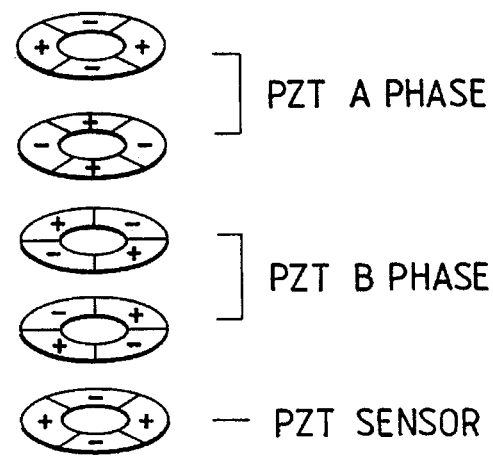

In the vibration member with the above-mentioned arrangement, as the piezoelectric elements 2 clamped between the main and sub elastic vibration members 1 and 3, the following two methods can be employed. That is, in one method, piezoelectric members each of which has different polarization directions to have a diameter portion as a boundary, as shown in FIG. 4A, are used to form a vibration shown in FIG. 2A and, more specifically, in FIG. 11A. In the other method, piezoelectric elements, each of which is equally divided into four sections to alternately have different polarization directions, as shown in FIG. 4B, are used to form a vibration shown in FIG. 2B and, more specifically, in FIG. 11B.

Figure 3A:
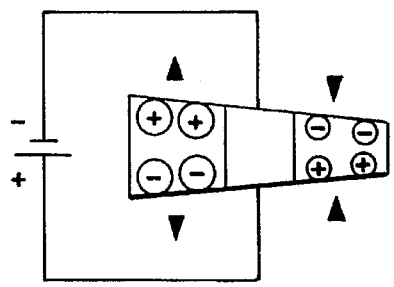
FIGS. 3A and 3B are diagrams showing the polarities of voltages applied to piezoelectric elements shown in FIG. 4A and the displacement directions of the piezoelectric elements.
Figure 3B:
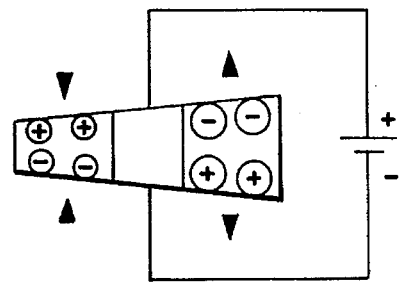

In the piezoelectric elements shown in FIG. 4A, the first and second piezoelectric elements (PZTs) from the top are used as A-phase driving elements, the third and fourth piezoelectric elements (PZTs) are used as B-phase driving elements, and the lowermost piezoelectric element (PZT) is used as a sensor element. The A-phase PZTs and the B-phase PZTs are stacked to have a 90° phase shift therebetween, and the sensor PZT is stacked in phase with the A-phase PZTs. For example, when voltages having polarities shown in FIG. 3A are applied to the two stacked A-phase PZTs, one half portion expands and the other half portion contracts both in the thickness direction. On the contrary, when voltages having opposite polarities shown in FIG. 3B are applied, the one half portion contracts and the other half portion expands.

Figure 2A:
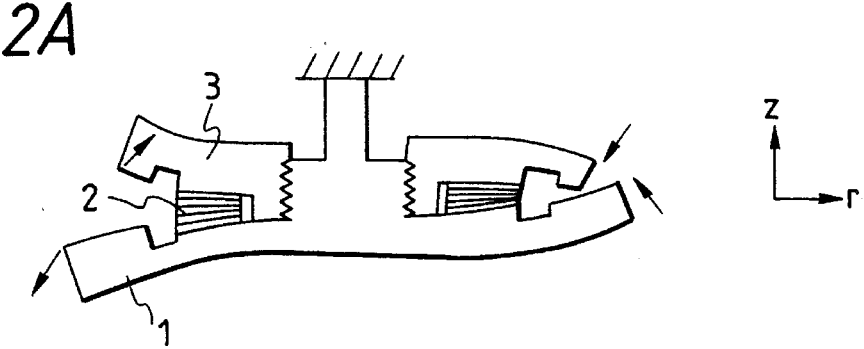

When AC voltages are applied to these A- and B-phase PZTs, vibrations having a mode shape shown in FIG. 2A are similarly formed on the main and sub elastic vibration members 1 and 3 so as to have a 90° phase shift therebetween to have the Z-axis as the center. When a 90° temporal phase difference is given to AC voltages to be applied to the A and B phases, an elliptic motion is formed on the driving surface 1a of the main elastic vibration member 1 and the flange portion 3a of the sub elastic vibration member 3.

This elliptic motion defines an ellipse which forms a circle (when viewed from a position on the Z-axis) upon projection onto an r-θ plane if the driving modes by the A and B phases have an equal amplitude.

Paying attention to the polarization directions and the phase difference between the A and B phases of the piezoelectric elements shown in FIG. 4A, they are the same as those of a vibration member of a known rod-shaped ultrasonic motor. However, since this rod-shaped ultrasonic motor has a length sufficiently larger than its diameter, its vibration mode shape defines a vibration having anti-node positions at the two ends in the longitudinal direction. On the other hand, in a disk-shaped vibration member having a radial length sufficiently larger than its axial length like in this embodiment, the vibration mode shape defines a vibration having anti-node positions at the two ends in the radial direction.

Figure 11A:
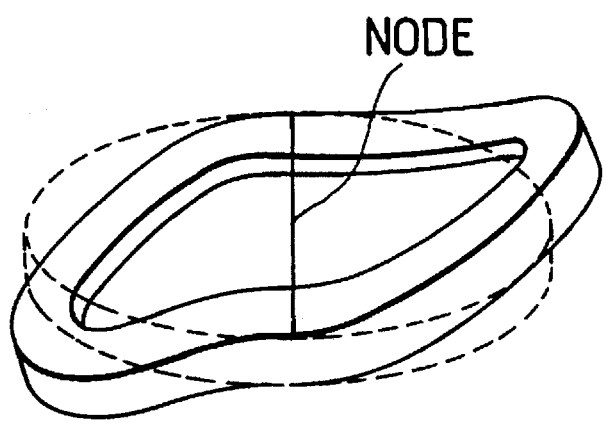

In this embodiment, in a vibration having a node diameter forming one node in a diameter portion, if no flange portion 3a is formed on the sub elastic vibration member, a vibration having a mode shape shown in FIG. 11A cannot be formed on the main elastic vibration member 1.

More specifically, as shown in FIG. 11A, it is impossible in principle of vibration driven systems to vibrate the main elastic vibration member 1 asymmetrically to the node position (i.e., in opposite displacement directions at the two ends, in the radial direction, of the elastic vibration member to have a radial line passing the node position as the center). For this reason, in this embodiment, the sub elastic vibration member 3 is integrally coupled to the main elastic vibration member 1 to constitute a single vibration system, and vibrations having a 180° phase shift therebetween are formed on the sub elastic vibration member 3 to obtain symmetricity of a vibration (the two ends, in the radial direction, of the vibration member correspond to the node or anti-node positions, and the main and sub elastic vibration members have opposite displacement directions), thereby forming a vibration having a mode shape shown in FIG. 11A on the main elastic vibration member 1.

Figure 11B:
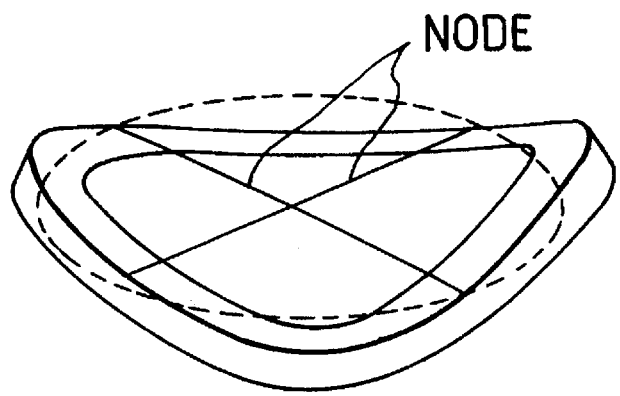

In contrast to this, in a vibration having node diameters as shown in FIG. 11B, since the main elastic vibration member 1 is symmetrical to the node position (to have the same displacement directions at the two sides, in the radial direction, of the elastic vibration member to have a radial line passing the node position as the center), vibrations based on two travelling waves are formed on the main elastic vibration member 1 without requiring the flange portion 3a for forming opposite phase vibrations by the sub vibration elastic member 3.

Figure 2B:
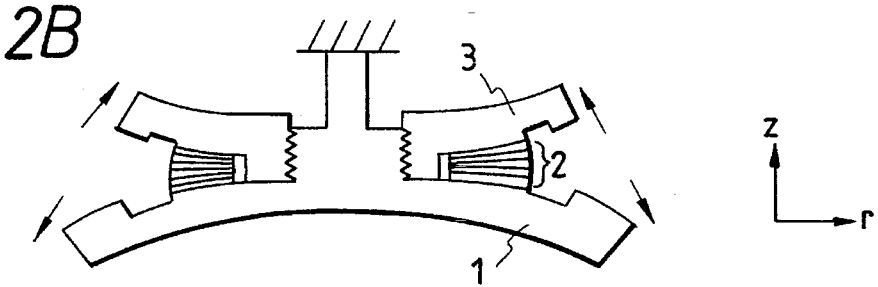

On the other hand, in the case of the piezoelectric elements 2 shown in FIG. 4B, when a positive voltage is applied to an upper electrode plate (not shown) of the A-phase PZTs and a negative voltage is applied to a lower electrode plate (not shown) thereof, expansion and contraction in the thickness direction is symmetrically formed. Similarly in the B-phase PZTs, expansion and contraction in the thickness direction is symmetrically formed as in the A-phase PZTs to have a 45° phase shift about the Z-axis. Therefore, when AC voltages having a 90° temporal phase difference therebetween are applied to the A- and B-phase PZTs, in the vibration member, elliptic motion components formed on the main and sub elastic vibration members 1 and 3 at the two ends in the radial direction are in phase with each other and have opposite signs, as indicated by arrows in FIG. 2B, i.e., a plane-symmetrical elliptic motion is formed, as shown in FIGS. 2B and 11B.

In this case, at positions having a 90° phase shift therebetween, elliptic motion components are formed to have a 180° phase shift therebetween (opposite phases), as shown in FIG. 11B. In the vibration having a node diameter shown in FIG. 2A, since the wave number is 1, elliptic motion components formed on the main and sub elastic vibration members 1 and 3 at the two ends in the radial direction have opposite directions, as indicated by arrows in FIG. 2A.

As described above, a travelling wave shown in FIG. 2A or 2B is formed on the driving portion 1a of the main elastic vibration member 1 constituting the vibration member by the displacement, in the out-of-plane direction, of the piezoelectric elements 2, and the rotor 4, which is in press contact with the driving portion 1a, is rotated by a frictional driving force. The rotor 4 transmits the rotational force to the output member 7, and an output is extracted via the gear portion 12.

As described above, in this embodiment, since the elastic vibration member constituting the vibration member can have a disk shape, the axial length of the vibration member can be greatly shortened as compared to a rod-shaped ultrasonic motor using a bending mode, and this embodiment greatly contributes to miniaturizing an ultrasonic motor.

Figure 5:
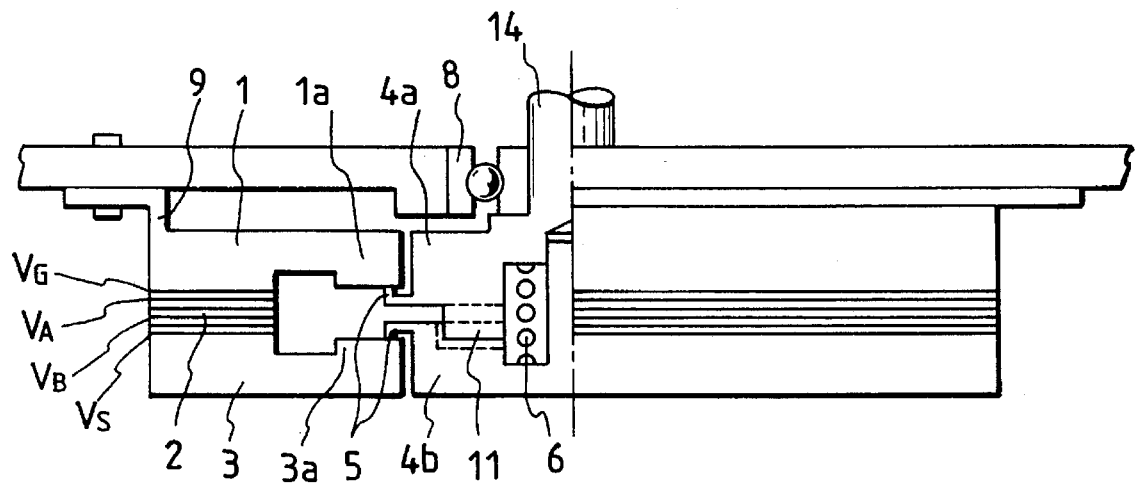
FIG. 5 is a side sectional view showing the second embodiment of the present invention.

FIG. 5 shows the second embodiment of the present invention.

In the first embodiment described above, the driving portion 1a is formed on the outer peripheral portion of the main elastic vibration member, and the flange portion 3a of the sub elastic vibration member 3 is not utilized as a means for extracting a driving force. However, in this embodiment, both the driving portion 1a of the disk-shaped main elastic vibration member 1 and the flange portion 3a of the disk-shaped sub elastic vibration member 3 are formed on the inner peripheral side, and are utilized as means for extracting a driving force. In this embodiment, both the main and sub elastic vibration members 1 and 3 have a doughnut shape defining an inner circumferential hollow portion rather than the disk shape, and first and second rotors 4a and 4b having an output shaft 14 are arranged in the hollow portion.

Collar spring-shaped sliding portions 5 are respectively formed on the outer peripheral portions of the first and second rotors 4a and 4b. The sliding portion 5 of the first rotor 4a contacts the driving portion 1a formed on the inner peripheral side of the main elastic vibration member 1, and the sliding portion 5 of the second rotor 4b contacts the flange portion 3a formed on the inneperipheral side of the sub elastic vibration member 3. The first and second rotors 4a and 4b are coaxially fitted with each other, and are biased in directions to separate from each other by a coil spring 6 elastically inserted between the first and second rotors 4a and 4b, thus bringing the sliding portions in press contact with the driving portion 1a and the flange portion 3a. Note that the first and second rotors 4a and 4b are coupled by the pawl portion 11 to be movable in the axial direction and to be immovable about the axis, so that the rotational force of the two rotors 4a and 4b can be extracted from the output shaft 14.

In the vibration member of this embodiment, the stacked piezoelectric elements 2, electrode plates (not shown) arranged between the piezoelectric elements, and the electrode plate or the piezoelectric element and the main or sub elastic vibration member 1 or 3 are joined using an adhesive.

Figure 6A:
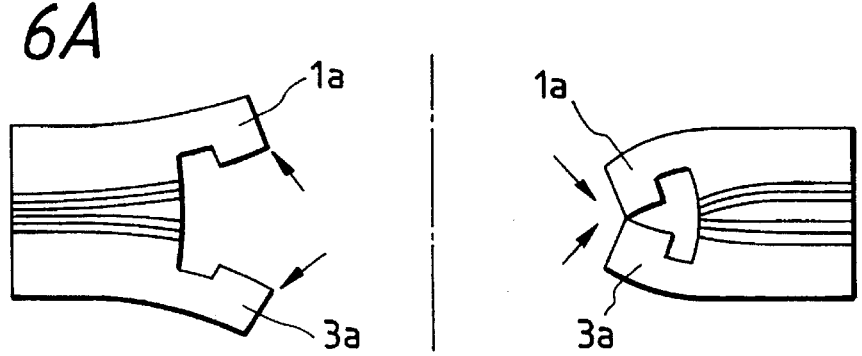
Figure 6B:
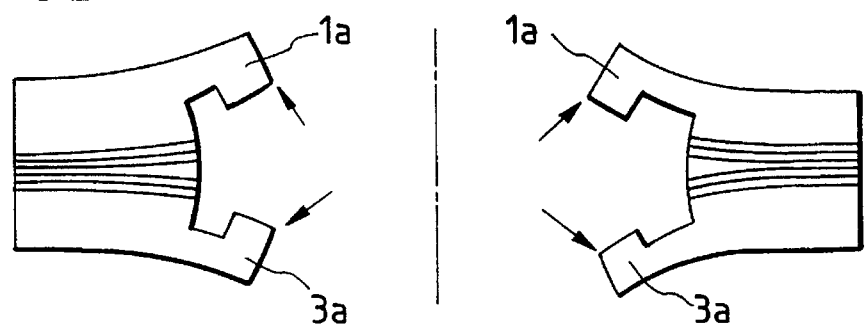

As the vibration mode of this embodiment, vibrations having node diameters shown in FIGS. 11A and 11B can be used as in the first embodiment described above. FIG. 6A shows a state wherein a vibration mode having one node diameter is formed in the vibration member, and FIG. 6B shows a state wherein a vibration mode having two node diameters is formed in the vibration member.

Figure 7:
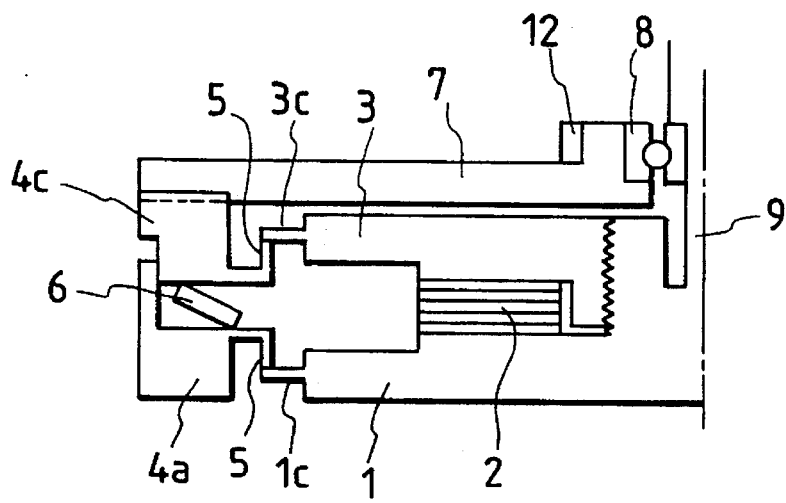
FIG. 7 is a side sectional view showing the third embodiment of the present invention.

FIG. 7 shows the third embodiment.

This embodiment corresponds to a modification of the first embodiment shown in FIG. 1. A collar spring-shaped driving portion 1c is formed to project outwardly from the outer circumferential end of the main elastic vibration member 1, and a collar spring-shaped flange portion 3c is similarly formed to project outwardly from the outer circumferential end of the sub elastic vibration member 3, so that the collar spring-shaped sliding portion 5 of the first rotor 4a contacts the driving portion 1c, and the collar spring-shaped sliding portion 5 of the second rotor 4b contacts the flange portion 3c.

The first and second rotors 4a and 4b are coupled by fitting (not shown) to be movable in the axial direction and to be immovable about the axis, and are biased in directions to separate from each other by the Belleville spring 6 arranged therebetween, thus bringing the sliding portions 5 in press contact with the driving portion 1c and the flange portion 3c.

The second rotor 4b is coupled to the output member 7 having the gear portion 12, and the rotation from the two rotors 4a and 4c is transmitted to the output member 7 axially supported by the ball bearing 8. In this embodiment, the vibration member can be driven in vibration modes respectively having one and two node diameters as in the first and second embodiments.

Figure 8:
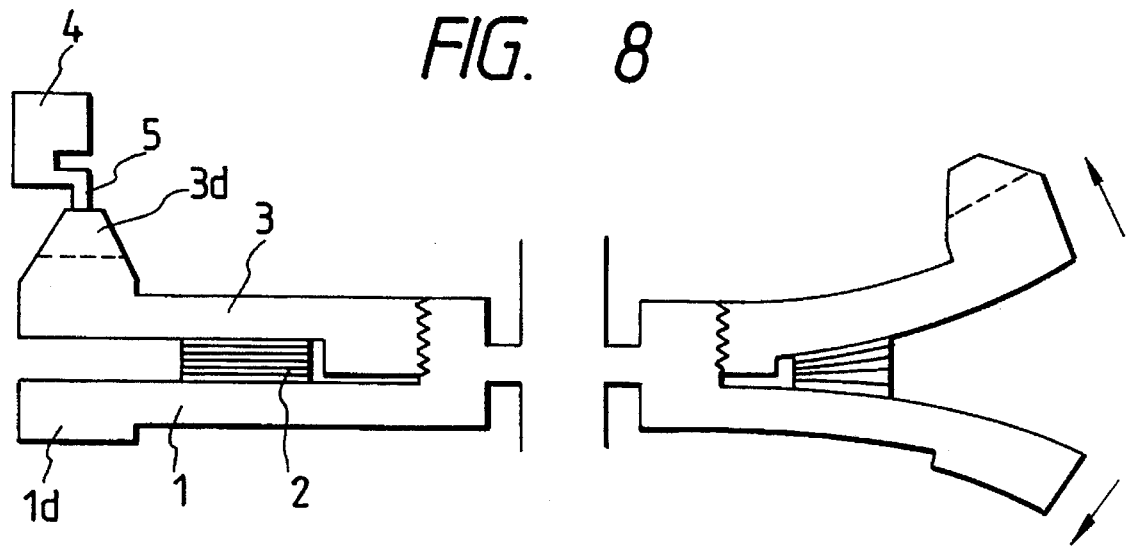
FIG. 8 is a side sectional view showing the fourth embodiment of the present invention.

FIG. 8 shows the fourth embodiment.

For example in a conventional ring-shaped ultrasonic motor, a piezoelectric element is joined to one surface of a elastic vibration member, and a travelling wave along the circumferential direction is formed in the elastic vibration member by a vibration, in the in-plane direction, of the piezoelectric element. In this case, the travelling wave has a wave number of 2 or more, e.g., 7. However, in this embodiment, a travelling wave having one node diameter, i.e., a wave number of 1, can be obtained by a vibration in the out-of-plane direction.

In this embodiment, the disk-shaped sub elastic vibration member 3 having a projecting portion 3d on its outer peripheral portion is fixed by a screw to the disk-shaped main vibration elastic member 1 having a vibration portion 1d on its outer peripheral portion, and the piezoelectric elements 2 shown in FIG. 4A are clamped and fixed between the main and sub elastic vibration members 1 and 3, thus constituting a vibration member. A large number of slits are formed on the projecting portion 3d of the sub elastic vibration member 3 along the radial direction. The collar spring-shaped sliding portion 5 formed on the outer peripheral portion of the rotor 4 is brought into press contact with the projecting portion 3d via a compression means (not shown).

In this embodiment, the vibration member can vibrate in a vibration mode having one node diameter as has been described in the first embodiment described above. This embodiment is different from the vibration member of the conventional ring-shaped ultrasonic motor in that the piezoelectric members 2 are clamped between the main and sub elastic vibration members 1 and 3, and the vibration member is vibrated by the out-of-plane vibration of the piezoelectric elements 2.

More specifically, when a stack of a plurality of piezoelectric elements is clamped, the number of piezoelectric elements can be increased, and a large force factor can be obtained, thus achieving a large output and lower power consumption than the conventional ring-shaped ultrasonic motor.

Since the out-of-plane vibration of the piezoelectric elements is utilized, a larger displacement than that obtained by utilizing the in-plane vibration can be obtained, and motor efficiency can be improved.

Such an advantage can be applied not only to a case of one node diameter, but also to a case of a plurality of node diameters.

Figure 9A:
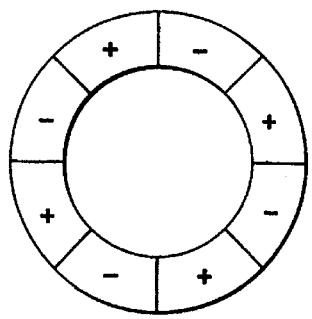
FIGS. 9A and 9B are plan views showing the polarization directions of piezoelectric elements in the fifth embodiment.
Figure 9B:
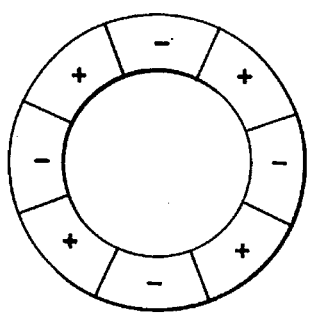

FIGS. 9A and 9B show the fifth embodiment, and show the polarization directions of the A- and B-phase PZTs of the piezoelectric elements 2 when the vibration member in each of the first to fourth embodiments is driven to have four node diameters. In the case of two node diameters shown in FIG. 4B, the A- and B-phase PZTs have a 45° positional phase difference therebetween. However, in the case of four node diameters of this embodiment, the A- and B-phase PZTs have a 22.5° positional phase difference therebetween. As can be seen from the above description, the number of node diameters can be an arbitrary integer.

Figure 10:
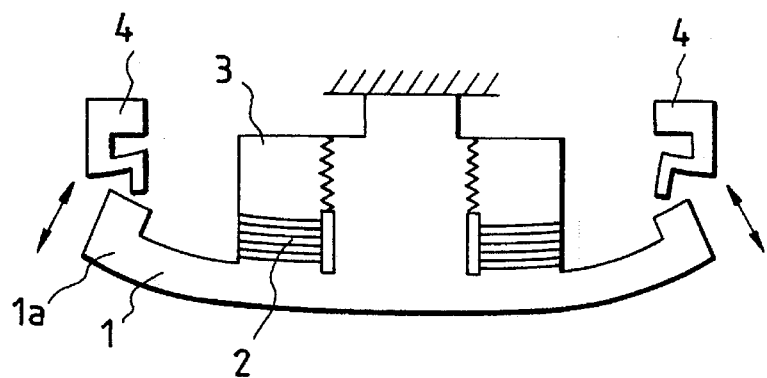
FIG. 10 is a side sectional view showing the sixth embodiment of the present invention.

In this manner, when the number of node diameters is 2 or 4, the flange portion which is used for balancing a vibration of the sub elastic vibration member 3 to form a travelling wave on the main elastic vibration member 1 is not always required, as has been described in the first embodiment. In this case, as shown in FIG. 10 as the sixth embodiment, the sliding portion 5 of the rotor 4 may be brought into press contact with the driving portion 1a on the outer peripheral portion of the main vibration elastic member 1, and the piezoelectric elements 2 may be clamped between the main vibration elastic member 1 and the sub vibration elastic member 3 which has no outer peripheral flange portion and serves as a nut.

In this embodiment, the distortion amount in the thickness direction of the piezoelectric elements becomes smaller than a case wherein both the main and sub vibration elastic members 1 and 3 vibrate, as shown in FIG. 8. However, there is a merit of allowing easy support of the vibration member.

The ultrasonic motor of each of the above embodiments can be utilized as, e.g., an AF motor for a camera. Alternatively, the vibration member may be directly brought into press contact with a paper sheet to serve as a driving source of a paper feeder. Furthermore, the vibration member may be brought into press contact with a fixed linear rail to serve as a linear motor (i.e., the vibration member side moves).

As described above, according to each of the abovementioned embodiments, since the vibration member can have a low-profile structure, an ultrasonic motor or the like can be made compact, and since a plurality of piezoelectric elements can be stacked, a large force factor can be obtained by a low voltage.

What is claimed is:

1. A vibration driven apparatus comprising:

a first elastic vibration member;

a second elastic vibration member;

an electro-mechanical energy conversion element clamped between said first and second elastic vibration members; and a first contact member contacting at least one of said first and second elastic vibration members, wherein a projection region which does not overlap said conversion element is arranged on said at least one elastic vibration member, said first contact member contacts only said projection region, and said first contact member moves relative to said at least one elastic vibration member by a vibration of said at least one elastic vibration member, wherein said first and second elastic vibration members are formed into a disk shape, and wherein said projection region of said at least one elastic vibration member is formed at an inner diameter side.

2. A vibration driven apparatus comprising:

a first elastic vibration member;

a second elastic vibration member;

an electro-mechanical energy conversion element clamped between said first and second elastic vibration members;

a first contact member contacting at least one of said first and second elastic vibration members, wherein a projection region which does not overlap said conversion element is arranged on said at least one vibration elastic member, said first contact member contacts only said projection region, and said first contact member moves relative to said at least one vibration elastic member by a vibration of said at lest one vibration elastic member; and a second contact member contacting the other one of said first and second elastic vibration members, wherein a projection region which does not overlap said conversion element is arranged on said other elastic vibration member, said second contact member contacts only said projection region of said other elastic vibration member, and said second contact member moves relative to said other elastic vibration member by a vibration of said other elastic vibration member.

3. An apparatus according to claim 1, wherein said first and second elastic vibration members are coupled by a screw to clamp said conversion element therebetween.

4. An apparatus according to claim 2, wherein said first and second elastic vibration members are coupled by a screw to clamp said conversion element therebetween.

5. An apparatus according to claim 1, wherein said first and second elastic vibration members are formed into a disk shape.

6. An apparatus according to claim 2, wherein said first and second vibration elastic members are formed into a disk shape, and wherein said projection region of said at least one elastic vibration member is formed at an outer diameter side.

7. An apparatus according to claim 2, wherein said first and Second vibration elastic members are formed into a disk shape, and wherein said projection region of said at least one elastic vibration member is formed at an inner diameter side.

8. An apparatus according to claim 2, wherein said first and second elastic vibration members are formed into a disk shape.

9. An apparatus according to claim 8, wherein said projection regions of said at least one and said other elastic vibration members are formed at an outer diameter side.

10. An apparatus according to claim 8, wherein said projection regions of said at least one and said other elastic vibration members are formed at an inner diameter side.

11. An apparatus according to claim 1, wherein said at least one elastic vibration member is formed with a groove for amplifying a vibration amplitude of said projection region.

12. An apparatus according to claim 2, wherein said at least one elastic vibration member is formed with a first groove for amplifying a vibration amplitude of said projection region, and said other elastic vibration member is formed with a groove for amplifying a vibration amplitude of said projection region.

13. An apparatus according to claim 5, wherein said first and second elastic vibration members are formed to have different outer diameters.

14. An apparatus according to claim 1, further comprising:
a moving mechanism driven by said device.

15. An apparatus according to claim 5, wherein said conversion element is formed by a plurality of elements each having electrodes whose phases are shifted by 90° in a circumferential direction.

16. An apparatus according to claim 5, wherein said conversion element is formed by a plurality of elements each having electrodes whose phases are shifted by 45° in a circumferential direction.

17. An apparatus according to claim 5, wherein a vibration having one node diameter is produced on said first and second elastic vibration members.

18. An apparatus according to claim 5, wherein a vibration having more than or equal to two node diameters is produced on said first and second elastic vibration members.

19. A vibration driven apparatus comprising:
a first elastic vibration member;
a second elastic vibration member;
an electro-mechanical energy conversion element clamped between said first and second elastic vibration members; and
a first contact member contacting at least one of said first and second elastic vibration members,
wherein a projection region which does not overlap said conversion element is arranged on said at least one elastic vibration member, said first contact member contacts only said projection region, and said first contact member moves relative to said at least one elastic vibration member by a vibration of said at least one elastic vibration member, and wherein said at least one elastic vibration member is formed with a groove for amplifying a vibration amplitude of said projection region.

20. An apparatus according to claim 19, further comprising:
a second contact member contacting the other one of said first and second elastic vibration members, and
wherein a projection region which does not overlap said conversion element is arranged on said other elastic vibration member, said second contact member contacts only said projection region of said other elastic vibration member, and said second contact member moves relative to said other elastic vibration member by a vibration of said other elastic vibration member.

21. An apparatus according to claim 20, wherein said at least one elastic vibration member is formed with a first groove for amplifying a vibration amplitude of said projection region, and said other elastic vibration member is formed with a groove for amplifying a vibration amplitude of said projection region.

22. An apparatus according to claim 19, wherein said first and second elastic vibration members are coupled by a screw to clamp said conversion element therebetween.

23. An apparatus according to claim 20, wherein said first and second elastic vibration members are coupled by a screw to clamp said conversion element therebetween.

24. An apparatus according to claim 19, wherein said first and second elastic vibration members are formed into a disk shape.

25. An apparatus according to claim 24, wherein said projection region of said at least one elastic vibration member is formed at an outer diameter side.

26. An apparatus according to claim 24, wherein said projection region of said at least one elastic vibration member is formed at an inner diameter side.

27. An apparatus according to claim 20, wherein said first and second elastic vibration members are formed into a disk shape.

28. An apparatus according to claim 27, wherein said projection regions of said at least one and said other elastic vibration members are formed at an outer diameter side.

29. An apparatus according to claim 27, wherein said projection regions of said at least one and said other elastic vibration members are formed at an inner diameter side.

30. An apparatus according to claim 24, wherein said first and second elastic vibration members are formed to have different outer diameters.

31. An apparatus according to claim 19, further comprising:
a moving mechanism driven by said device.

32. An apparatus according to claim 24, wherein said conversion element is formed by a plurality of elements each having electrodes whose phases are shifted by 90° in a circumferential direction.

33. An apparatus according to claim 24, wherein said conversion element is formed by a plurality of elements each having electrodes whose phases are shifted by 45° in a circumferential direction.

34. An apparatus according to claim 24, wherein a vibration having one node diameter is produced on said first and second elastic vibration members.

35. An apparatus according to claim 24, wherein a vibration having more than or equal to two node diameters is produced on said first and second elastic vibration members.

36. A vibration driven apparatus comprising:
a first elastic vibration member;
a second elastic vibration member;
an electro-mechanical energy conversion element clamped between said first elastic vibration member and said second elastic vibration member; and
a first contact member contacting at least one of said first and second elastic vibration members,
wherein said at least one elastic vibration member comprises a projection region which does not overlap said conversion element, said first contact member contacts only said projection region, and said first contact member moves relative to said at least one elastic vibration member by a vibration of said at least one elastic vibration member, and wherein said first contact member contacts the projection region of said at least one elastic vibration member at a side of said at least one elastic member where said conversion element is clamped.

37. An apparatus according to claim 36, further comprising:
a second contact member contacting the other one of said first and second elastic vibration members, and
wherein a projection region which does not overlap said conversion element is arranged on said other elastic vibration member, said second contact member contacts only said projection region of said other elastic vibration member, and said second contact member moves relative to said other elastic vibration member by a vibration of said other elastic vibration member.

38. An apparatus according to claim 37, wherein said second contact member contacts said other elastic vibration member at a side where said conversion element is clamped.

39. An apparatus according to claim 36, wherein said first and second elastic vibration members are formed into a disk shape.

40. An apparatus according to claim 39, wherein said projection region of said at least one elastic vibration member is formed at an outer diameter side.

41. An apparatus according to claim 39, wherein said projection region of said at least one elastic vibration member is formed at an inner diameter side.

42. An apparatus according to claim 37, wherein said first and second elastic vibration members are formed into a disk shape.

43. An apparatus according to claim 42, wherein said projection regions of said at least one and said other elastic vibration members are formed at an outer diameter side.

44. An apparatus according to claim 42, wherein said projection regions of said at least one and said other elastic vibration members are formed at an inner diameter side.

45. An apparatus according to claim 36, wherein said at least one elastic vibration member is formed with a groove for amplifying a vibration amplitude of said projection region.

46. An apparatus according to claim 37, wherein said at least one elastic vibration member is formed with a first groove for amplifying a vibration amplitude of said projection region, and said other elastic vibration member is formed with a groove for amplifying a vibration amplitude of said projection region.

47. An apparatus according to claim 39, wherein said first and second elastic vibration members are formed to have different outer diameters.

48. An apparatus according to claim 36, further comprising:

a moving mechanism driven by said device.

49. An apparatus according to claim 39, wherein said conversion element is formed by a plurality of elements each having electrodes whose phases are shifted by 90° in a circumferential direction.

50. An apparatus according to claim 39, wherein said conversion element is formed by a plurality of elements each having electrodes whose phases are shifted by 45° in a circumferential direction.

51. An apparatus according to claim 39, wherein a vibration having one node diameter is produced on said first and second elastic vibration members.

52. An apparatus according to claim 39, wherein a vibration having more than or equal to two node diameters is produced on said first and second elastic vibration members.

* * * * *

UNITED STATES PATENT AND TRADEMARK OFFICE
CERTIFICATE OF CORRECTION

PATENT NO. : 5,585,685
DATED : December 17, 1996
INVENTOR(S) : TAKASHI MAENO, ET AL.

It is certified that error appears in the above-indentified patent and that said Letters Patent is hereby corrected as shown below:

At [56] References Cited

"5184172  7/1993  Japan" should read
--5-184172  7/1993  Japan--.

Column 4

Line 10, "an r$\theta$plane" should read --an r-$\theta$ plane--.
Line 64, "Similarly" should read --Similarly,--.

Column 8

Line 27, "lest" should read --least--.
Line 52, "Second" should read --second--.

Signed and Sealed this

Eighteenth Day of November 1997

Attest:

BRUCE LEHMAN

*Attesting Officer*　　　*Commissioner of Patents and Trademarks*